Oct. 30, 1962 J. A. TORO 3,061,767

TEMPERATURE COMPENSATED CAPACITOR

Filed Dec. 24, 1959

FIG. 1

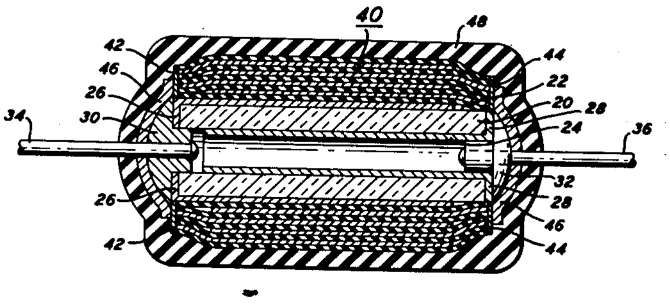

FIG. 2

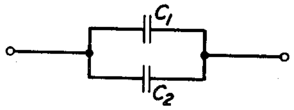

$C_{11}$ = CAPACITANCE AT TEMPERATURE $T_1$ OF UNIT NO. 1

$C_{12}$ = " " " $T_2$ " " NO. 1

$C_{21}$ = " " " $T_1$ " " NO. 2

$C_{22}$ = " " " $T_2$ " " NO. 2

$C_{S1}$ = " " " $T_1$ OF PARALLEL COMBINATIONS OF UNITS NO. 1 AND NO. 2

$C_{S2}$ = " " " $T_2$ OF PARALLEL COMBINATIONS OF UNITS NO. 1 AND NO. 2

$\alpha_1$ = TEMPERATURE COEFFICIENT OF UNIT NO. 1

$\alpha_2$ = " " " UNIT NO. 2

$\alpha$ = " " " PARALLEL COMBINATIONS OF UNITS NO. 1 AND NO. 2

$\Delta T = T_2 - T_1$

FIG. 3

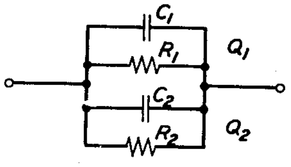

(3) $Q_S = \omega C_S R_S$ (4) $R_S = \frac{R_1 R_2}{R_1 + R_2}$ (5) $C_S = C_1 + C_2$

INVENTOR
J. A. TORO

BY Joseph C. Redmond, Jr.

ATTORNEY

United States Patent Office 3,061,767

Patented Oct. 30, 1962

3,061,767

TEMPERATURE COMPENSATED CAPACITOR

Joseph A. Toro, Andover, Mass., assignor to Bell Telephone Laboratories, Incorporated, New York, N.Y., a corporation of New York Filed Dec. 24, 1959, Ser. No. 862,010
5 Claims. (Cl. 317—247)

This invention relates to capacitors and more particularly to temperature compensated capacitors employed in electrical circuits subject to marked temperature changes.

Rural telephone carrier systems, as an example, include terminal members, the majority of which are mounted out of doors. For satisfactory operation of such systems, it has been found necessary to design the electrical circuits included in the terminal members to withstand temperature changes from minus 40° C. to plus 50° C. Some of the electrical circuits, for example, the signaling circuits included in the system, are greatly affected in performance by such a temperature change. A careful study of the signaling circuits indicates that the electric values of the inductive and capacitive elements included in the circuits can vary to such an extent with marked temperature change that the circuits are rendered inoperative. Temperature compensation of these reactive elements is made easy, however, by the fact that inductive elements which have a positive temperature coefficient (that is, the electric value thereof increases with temperature) may be compensated by associating therewith capacitors having negative temperature coefficient (that is, the electric value thereof decreases with temperature).

Capacitive elements having negative temperature coefficients are well known in the art. Connecting such an element in parallel with a positive temperature coefficient inductor has been found, however, to be an unsatisfactory solution for rural carrier signaling circuits. Such circuits operate on a relatively low current level and require components having high Q characteristics. The well-known types of negative temperature coefficient capacitors of the required capacitance ranges have either a high Q and an inadequate negative temperature coefficient or an inadequate Q and a high negative temperature coefficient. Neither of the above-mentioned types of capacitor are suitable in signaling circuits to compensate for a positive temperature coefficient inductor since either the Q of the circuit will be sacrificed or the circuit will not be sufficiently temperature independent for satisfactory operation under out of doors conditions.

An object of the present invention is an improved capacitor having a high Q and a large negative temperature coefficient which may be employed in electrical circuits subject to marked temperature changes.

Another object is a rugged and compact capacitor having a Q and negative temperature coefficient which may be adjusted over a wide range of values.

Still another object is a high capacitance, negative temperature coefficient capacitor which is easily fabricated and readily suitable for mass production manufacture.

These objects are accomplished in accordance with this invention, one embodiment of which comprises a ceramic capacitor on which is wound a plastic film capacitor, both the ceramic and plastic film capacitors having negative temperature coefficients. When the capacitors are connected to terminals so as to be in parallel and the absolute value of the temperature coefficient of the ceramic capacitor is selected to be as large as possible consistent with the desired negative temperature coefficient, the combined capacitors will have a high Q and a large negative temperature coefficient. The assembly of the combined capacitor is completed by encasing the combined or composite capacitor assembly in a suitable insulating and sealing material.

One feature of the present invention is the combination of a plastic film capacitor and a ceramic capacitor, both of which have negative temperature coefficients, to obtain a high Q and a controlled negative temperature coefficient for the combined capacitor assembly.

Another feature is a combined polystyrene film capacitor and ceramic capacitor wherein the temperature coefficient of the latter is made as large as possible in absolute value consistent with the desired temperature coefficient to obtain a high capacitance, high Q capacitor.

Still another feature is a high Q, negative temperature coefficient capacitor having a ceramic capacitor section which serves as a mandrel for winding a plastic film capacitor thereon, the Q and negative temperature coefficient of the capacitor being adjustable over a wide range of values.

A specific feature is a ceramic capacitor of tubular configuration having terminals attached to the ends thereof, a plastic film capacitor wound on the ceramic capacitor, both capacitors being attached to the terminal members by a soldered connection to the ends of each capacitor and a casing of insulating material enclosing the combined capacitor assembly.

These and other objects and features of the present invention will be more fully apprehended from the following detailed specification taken in conjunction with the appended drawing in which:

FIG. 1 is a cross-sectional view of the capacitor of the present invention;

FIG. 2 is an electrical schematic of the capacitor of FIG. 1; and

FIG. 3 is an equivalent circuit of the capacitor of FIG. 1 for finding the Q characteristic thereof.

Referring to FIG. 1, the present invention comprises a ceramic tube 20, typically one of the alkaline earth titanates (such as a titanate of barium or of barium and one or more of strontium and calcium) having a capacitive range from 15 to 2800 mmf.; a temperature coefficient range of −1500 parts per million per degree centigrade (p.p.m./° C.) to −5600 p.p.m./° C.; and a Q at 100 kc. in the approximate range of 75 to 500.

The outer surface 22 and the inner surface 24 of the ceramic tube 20 have conductive coatings or plates 26 and 28, respectively, thereon, preferably formed by conventional metallizing techniques. The inner and outer coatings overlap the tubular member at opposite ends thereof, the coatings at each end of the member 20 being connected to solder end caps 30 and 32, respectively. Embedded in the solder caps are terminals 34 and 36 for connecting the capacitor to outside circuitry. Also connected to the terminals through the solder caps is a plastic film capacitor 40, typically polystyrene or polyethylene, having a capacitance up to 1 mf.; a temperature coefficient in the range of −400 p.p.m. to 0; and, a Q at 100 kc. of 2000 or greater. The ceramic capacitor serves as a mandrel for the film capacitor which is wound thereon. The outside edges of the plastic film capacitor are suitably constructed, by means well known in the art, to form two common electrodes 42 and 44 for the capacitor. Each common electrode is connected to a different solder cap 46 by a metal spray so that the ceramic and plastic film capacitors are connected together in a parallel relationship.

Completing the capacitor assembly is a covering of insulating material 48, typically epoxy resin, which preserves the integrity of the capacitors from the surrounding atmosphere.

The composite capacitor of the present invention is adapted to provide a wide range of negative temperature coefficients and Q characteristics thereof. In the case of the negative temperature coefficients, the parameters which control the magnitude of this factor may be determined by considering FIG. 2 in which $C_1$ represents the capacity of the plastic film capacitor at any given temperature and $C_2$ represents the capacity of the ceramic capacitor at the same temperature.

Referring to FIG. 2, $C_{12}$, $C_{22}$ and $C_{S2}$ by definition are as follows:

$$C_{12}=C_{11}(1+\alpha_1\Delta T) \quad (1)$$

$$C_{22}=C_{21}(1+\alpha_2\Delta T) \quad (2)$$

$$C_{S2}=C_{S1}(1+\alpha\Delta T) \quad (3)$$

Because of the parallel combination of the plastic film and ceramic capacitors $$C_{S1}=C_{11}+C_{21} \quad (4)$$

$$C_{S2}=C_{12}+C_{22} \quad (5)$$

Solving Equation 3 for $\alpha$ gives $$\alpha=\frac{1}{\Delta T}\left(\frac{C_{S2}}{C_{S1}}-1\right) \quad (6)$$

Substituting Equations 4 and 5 and then 1 and 2 into Equation 6 gives $$\alpha=\frac{C_{11}\alpha_1+C_{21}\alpha_2}{C_{11}+C_{21}} \quad (7)$$

or, since all values in (7) are measured at the same temperature $$\alpha=\frac{C_1\alpha_1+C_2\alpha_2}{C_1+C_2} \quad (7')$$

Thus it may be seen from Equation 7' that the present invention permits any negative temperature coefficient ($\alpha$) to be obtained by selecting plastic film and ceramic capacitors with the proper temperature coefficients.

It can also be shown that given a total capacitance $C_S$, a desired negative temperature coefficient $\alpha$, the negative temperature coefficients $\alpha_1$ and $\alpha_2$ of the capacitors to be connected in parallel, then the individual capacitances of the capacitors connected in parallel will be as follows:

$$C_{11}=\frac{\alpha-\alpha_2}{\alpha_1-\alpha_2}C_{S1} \text{ or } C_1=\frac{\alpha-\alpha_2}{\alpha_1-\alpha_2}C_S \quad (8)$$

$$C_{21}=\frac{\alpha_1-\alpha}{\alpha_1-\alpha_2}C_{S1} \text{ or } C_2=\frac{\alpha_1-\alpha}{\alpha_1-\alpha_2}C_S \quad (9)$$

provided $\alpha_1 > \alpha > \alpha_2$ and $C_1$ and $C_2$ are both > zero.

Having selected the total capacitance of the temperature compensated capacitor, the temperature coefficient of the ceramic capacitor must be limited with respect to the plastic film capacitor in order to have a high Q characteristic for the combined capacitor assembly. This will be seen by considering FIG. 3 where $Q_S$ equals $\omega C_S R_S$, $Q_S$ being the total Q of the capacitor, $R_S$ being the total capacitor resistance, $C_S=C_1+C_2$ being the total capacitance of the capacitor at any one temperature, and $\omega$ being equal to $2\pi f$ where $f$ is frequency. Solving FIG. 3 for $R_S$ and $C_S$ and substituting into the expression $Q_S$ of the circuit gives the following:

$$Q_S=\frac{Q_1Q_2(C_1+C_2)}{Q_1C_2+Q_2C_1} \quad (10)$$

To find the maximum $Q_S$ for the composite capacitor, substitute $Q_1=lQ_2$ and $C_2=C_S-C_1$ into Equation 10 where $l$ is a constant >>1 and $C_S$ is as indicated in FIG. 3. $Q_S$ now appears as follows:

$$Q_S=\frac{Q_1C_S}{lC_S+C_1(1-l)} \quad (11)$$

For the maximum $Q_S$, $C_1$ must be as large as possible, but $C_1$ is fixed in magnitude by the temperature coefficients $\alpha_1$, $\alpha_2$ and the desired temperature coefficient $\alpha$ as indicated in Equation 8. If, however, in selecting $\alpha_1$ and $\alpha_2$ for a desired $\alpha$, the absolute magnitude of the temperature coefficient $|\alpha_2|$ is made as large as possible, then it will be seen from Equation 8 that $C_1$ will be a maximum. With $C_1$ a maximum, $Q_S$ will be a maximum for the particular design conditions. It should be noted, however, that $Q_2$ must be independent of $\alpha_2$ if the latter is to be varied to realize the maximum $Q_S$. With $Q_2$ varying as $\alpha_2$ is varied, then the change of the former could nullify or reduce the effect of the latter on $Q_S$. In ceramic capacitors it has been found that the Q thereof is substantially independent of $\alpha_2$ and when a ceramic capacitor of numerically large negative temperature coefficient is combined with a plastic film capacitor, as previously described, a high Q negative temperature capacitor will be realized.

As one typical example, a high Q, high capacitance, composite capacitor made in accordance with the principles of the present invention comprises an alkaline earth titanate ceramic capacitor section ($C_2$=520 mmf., $\alpha_2=-3300$, $Q_2=500$) and a polystyrene plastic film capacitor section ($C_1$=5300 mmf., $\alpha_1=-140$, $Q_1=5000$) connected in parallel. Based on the equations previously given, the composite capacitor can be designed to have a temperature coefficient ($\alpha$) of the order of −550 p.p.m. with a total capacitance of 5800 mmf. and a $Q_S$ of approximately 1100. The composite capacitor's ratio of $C_1/C_2$ is approximately 10.5/1. In general, to achieve the results of the present invention, it is necessary that this ratio be at least 9/1. Preferably, this ratio is at least 10.5/1. Also, the composite capacitor's $\alpha_2$ (ceramic capacitor temperature coefficient) of −3300 p.p.m. has been found to be the minimum required value to obtain the optimum temperature coefficient and Q combination for the purposes described above.

The composite capacitor of the present invention has the advantage of rugged and compact structure from the epoxy resin casing and the ceramic capacitor which serves as a mandrel for receiving the plastic film capacitor. Moreover, the assembly of the composite capacitor is advantageously suitable for mass production techniques since no special interconnections are required between the plastic film and ceramic capacitor which would require the services of a skilled operator to make such an interconnection. The interconnections between the capacitors of the present invention are readily completed by well-known techniques which may be performed by automatic machinery.

Summarizing briefly, the present invention has disclosed a high Q, negative temperature coefficient capacitor which is advantageously suitable for mass production manufacture. The composite capacitor, when combined in an electrical circuit with a positive temperature coefficient inductor, renders the circuit substantially temperature independent for marked temperature changes provided the temperature characteristics of the inductor and composite capacitors are equal and opposite.

It is understood that numerous other embodiments of the present invention may be made by those skilled in the art without departing from the spirit and scope of the present invention.

What is claimed is:

1. A high Q capacitor having a negative temperature coefficient comprising a ceramic capacitor on which is wound a plastic film capacitor, said ceramic capacitor having the maximum possible capacitive value for a desired temperature coefficient $$\frac{C_1\alpha_1+C_2\alpha_2}{C_1+C_2}$$

where $C_1$ is the capacitance of the plastic film capacitor, $C_2$ is the capacitance of the ceramic capacitor and $\alpha_1$ and $\alpha_2$ are the negative temperature coefficients thereof respectively; said capacitor assembly including terminal members embedded in solder caps secured to said ceramic capacitor, means for connecting said ceramic capacitor and plastic film capacitors to said terminal members, and insulating material covering the combined capacitor assembly.

2. The capacitor as defined in claim 1 wherein polystyrene is the dielectric of the plastic film capacitor and the ceramic capacitor has an alkaline earth titanate dielectric.

3. The capacitor as defined in claim 2 where the capacitive value of the ceramic capacitor is not greater than $C_1/10.5$.

4. A capacitor assembly having a high negative temperature coefficient and a high Q comprising a tubular ceramic capacitor having a low capacitance, a high numerical value negative temperature coefficient, and a low Q, a plastic film capacitor having a high capacitance, a low numerical value temperature coefficient and a high Q wrapped around the ceramic capacitor, and means connecting the two capacitors in parallel.

5. A capacitor assembly as in claim 4 in which the ceramic capacitor is within the capacitance range 15 to 2800 micromicrofarads, within the temperature coefficient range minus 1500 to minus 5600 parts per million per degree centigrade and has a Q at 100 kilocycles per second in the approximate range 75 to 100; and in which the plastic film capacitor has a capacitance up to 1 microfarad, a temperature coefficient in the range minus 400 to 0 parts per 1,000,000 per degree centigrade and a Q at 100 kilocycles per second of 2,000 or greater.

References Cited in the file of this patent

FOREIGN PATENTS

| | | |
|---|---|---|
| 543,279 | Great Britain | Feb. 17, 1942 |
| 593,749 | Great Britain | Oct. 24, 1947 |
| 598,817 | Great Britain | Feb. 26, 1948 |